United States Patent [19]

Tarrant

[11] Patent Number: 5,208,671
[45] Date of Patent: May 4, 1993

[54] TELETEXT DECODER ARRANGEMENT

[75] Inventor: David R. Tarrant, Romsey, England

[73] Assignee: U.S. Philips Corporation, New York, N.Y.

[21] Appl. No.: 794,284

[22] Filed: Nov. 19, 1991

[30] Foreign Application Priority Data

Nov. 30, 1990 [GB] United Kingdom ............... 9026041

[51] Int. Cl.⁵ .......................... H04N 7/04; H04N 7/08
[52] U.S. Cl. ..................................... 358/147; 358/142
[58] Field of Search ........................ 358/142, 147, 146

[56] References Cited

U.S. PATENT DOCUMENTS

| | | | |
|---|---|---|---|
| 4,679,083 | 7/1987 | Schmitz et al. | 358/147 |
| 4,701,794 | 10/1987 | Fröling et al. | 358/147 |
| 4,931,870 | 6/1990 | den Hollander | 358/147 |
| 4,991,018 | 2/1991 | Davis | 358/147 |
| 5,038,212 | 8/1991 | Van Den Hombeyh et al. | 358/147 |

FOREIGN PATENT DOCUMENTS 0333029 9/1989 European Pat. Off. .
2231470 11/1990 United Kingdom .

Primary Examiner—John K. Peng

[57] ABSTRACT

A teletext decoder arrangement comprises a page memory (PM) operable under the control of a data acquisition circuit (DAC) for storing a teletext page to be displayed, and a background memory (BM) in which teletext data packets are stored in the order in which they are received, a scanning circuit (SC) being provided which, when a teletext page is requested, causes the data packets in the background memory (BM) to be scanned in the B reverse order to that in which they were received to locate the most recently received version of the required teletext page, and to cause the data packets of the required page to be output to the data acquisition circuit (DAC) in the order in which they were received for storage in the page memory (PM) and subsequent display.

18 Claims, 2 Drawing Sheets

TELETEXT DECODER ARRANGEMENT

FIELD OF THE INVENTION

This invention relates to a teletext decoder arrangement for teletext transmissions and to a method of decoding teletext transmissions being especially applicable to such an arrangement and method for teletext transmissions which conform to the World System Teletext specification. The specification for World System Teletext (WST) is set out in the document "World System Teletext and Data Broadcasting System"—Technical Specification, published December 1987 by the United Kingdom Department of Trade and Industry.

BACKGROUND OF THE INVENTION

In World System Teletext, a quantity of teletext information to be displayed as an entity on a television screen is termed a page. The pages are grouped together to form "magazines", and up to eight magazines may be provided, each of which may include up to 100 pages. All of the pages which are available for display are transmitted in a recurrent cycle, with or without up-dating page information, as appropriate. A teletext television receiver includes a teletext decoder and any page selected by a viewer for B display is acquired by the teletext decoder from the cyclic transmission the next time it occurs therein and is stored in the page memory of the teletext decoder until replaced by a subsequently acquired page.

Because of the large number of pages which are transmitted each page is only transmitted typically once every 20 to 30 seconds so that when a particular page is selected a waiting time of up to 30 seconds can be expected. This waiting time is unacceptable to many users. The waiting time can be reduced by adding extra memory in the teletext decoder in which additional pages can be captured, and if a user happens to select a pre captured page, the waiting time is eliminated. Many broadcasters now send additional information, e.g. Full Level One Features (FLOF) in the U.K. or Table of Pages (TOP) in Germany, to instruct the decoder as to which pages are to be pre-captured. These pages are usually those the broadcaster guesses the user will want to see next and are typically regulated to the current display page. A system operating in accordance with this principle is currently available and is referred to as "Fastext", and defines 4 pages to be pre captured. If a user makes page requests at random, it is unlikely that the decoder will have pre-captured the page due to the small amount of memory which is currently used.

Teletext decoders like ECCT (Philips integrated circuit SAA 5243) and IVT (Philips integrated circuit SAA 5246) are limited to storing up to 8 pages in memory and the controlling software does not have many options when determining which pages to capture and where to map them. Higher performance decoders such as DVTB (Philips integrated circuit SAA 9042) can capture up to 64 pages in memory but the store management task becomes very complex requiring a large amount of software and this places a high burden on the so-called $I^2C$ bus as the controlling microprocessor used with DVTV needs to communicate very frequently with the decoder integrated circuit.

A so called Background Memory concept has been proposed which seeks to alleviate the waiting time experienced in teletext decoders. Such a background memory concept is disclosed in EP-A2-0333029. In a teletext decoder provided with a background memory it is arranged that the last N teletext data packets which are transmitted, a teletext data packet being, for example, the teletext data which corresponds to a row of a teletext display page, are stored in the background memory, (N depending on the size of the background memory). As each new packet arrives it overwrites the oldest packet currently stored, thus continuously updating the memory. When a page request is made, the contents U of the background memory are scanned rapidly to determine whether the required page is stored therein, and if it is, it is immediately transferred to the page memory of the teletext decoder for display purposes. Although it may have taken up to 30 seconds for those packets to be transmitted and stored in the background memory, scanning of the memory can be achieved in under a second with the result that if the requested page is in the background memory, the waiting time is virtually eliminated.

Thus, the normal teletext decoder page memory no longer needs to be partitioned into separate page stores, a single page memory only being required, and the microprocessor is relieved of the task of managing a multi-page store, thereby relieving the burden on the $I^2C$ bus. In principle, the background memory technique works with any size of memory, the more memory that is provided the more data packets can be stored, thereby increasing the possibility of a requested page being present in the background memory, and increasing the probability of the waiting time being eliminated. The waiting time is completely eliminated if sufficient background memory is available to hold the data packets of all the transmitted pages.

However, the background memory concept suffers from a number of disadvantages. Firstly, background memory needs to be of relatively large size in order to store as many data packets as possible. Secondly, when the background memory is scanned, the scan starts from the data packet which has been stored for the longest period of time and continues to the last received data packet. With a large background memory, this can result in the required page being present in the background memory more than once and the first occurrence of the page which is detected by the scan will not necessarily be the most up-to-date version of the particular page, the page possibly having been updated before it was subsequently re-transmitted and stored for the second time in the background memory. Also, the requested page may be a rotating page where a sub-page X is followed by a sub-page Y, both of which would be stored in the background memory. When the background memory is scanned, sub-page X would be found and transferred to the page memory for display. Once scanning is completed or stopped, the teletext decoder reverts to looking at the "live" teletext data and the next sub-page which would be received and displayed would be sub-page Z, resulting in the user missing sub page Y. A related problem arises when the technique of "advanced" page headers is used in which an isolated page header is transmitted in advance of the actual page. This is sometimes done to improve transmission efficiency. When the background memory is scanned, the scan automatically stops after detecting the first occurrence of the page header, but this will not be followed by the actual page corresponding to that page header. Consequently the page would not be seen.

SUMMARY OF THE INVENTION

It is an object of the present invention to provide a teletext decoder arrangement having a page memory and a background memory which enables more efficient use of the background memory to be achieved and which overcomes the aforesaid problems associated with the scanning of the background memory.

According to one aspect of the present invention there is provided a teletext decoder arrangement for teletext transmissions comprising a page memory for storing data packets of the teletext transmissions corresponding to a teletext page, a background memory for storing data packets of the teletext transmissions as they are received, and scanning means for causing the stored data packets of the background memory to be scanned to locate the data packets corresponding to a required teletext page, characterized in that the scanning means is adapted to scan the stored data packets of the background memory in the reverse order to that in which they are received to locate the data packets corresponding to the required teletext page.

In this way, the most recently received data packets are scanned first and the problems associated with forward scanning from the longest stored data packet are overcome.

In a preferred arrangement for carrying out the aforesaid first aspect of the present invention, means will be provided, operable when the the data packets of the required teletext page have been located, for clearing said page memory.

In this way the teletext decoder arrangement is adapted to receive teletext transmissions which are made in so-called row adaptive manner, that is where only those rows or data packets are transmitted which do not contain all spaces or which have changed since their previous transmission. For example, a subtitle page might consist of only two data packets, a page header and a line of dialogue. Row adaptive transmissions enable only those two rows or data packets to be transmitted thereby greatly increasing the effective capacity of the background memory. In the background memory this will occupy only 2 rows but in a page store 1K bytes (25 rows) would have to be reserved.

In carrying out the invention according to the aforesaid first aspect it may be arranged that when the data packets corresponding to the required teletext page are located in the background memory, the scanning means is caused to scan them in the order in which they were received to cause them to be stored in the page memory.

It may also be arranged that means is provided, operable in conjunction with said reverse order scanning means, for determining only the packet address of each of the stored data packets, and means, operable only in respect of stored data packets which correspond to a page header, for determining the page address of each the page header, thereby to locate the page header corresponding to the required teletext page. In this way the time required to effect scanning of the background memory is greatly reduced.

When the page header corresponding to the required teletext page is located, means may be operable to cause the scanning of packets in the background memory in the order in which they were received to commence at a given number of packets prior to that in which the page header was located. This prevents only part of a page being displayed if a page is interrupted, say, by a subtitle page.

In another preferred arrangement in accordance with the aforesaid first aspect of the present invention means is provided, operable on the data packets of the teletext transmissions, for inhibiting the storage of unwanted data packets in the background memory, thereby further increasing the effective capacity of the background memory.

According to another aspect of the present invention there is provided a method of decoding teletext transmissions comprising the steps of storing data packets of the teletext transmissions corresponding to a teletext page in a page memory, storing data packets of the teletext transmissions as they are received in a background memory, and scanning the stored data packets of the background memory to locate the data packets corresponding to a required teletext page, characterized by the further step of arranging that the stored data packets of the background memory are scanned in the reverse order to that in which they are received to locate the data packets corresponding to the required teletext page.

A preferred method for carrying out the aforesaid another aspect of the present invention is characterised by the step of clearing said page memory when the data packets of the required teletext page have been located.

In carrying out the method according to the aforesaid another aspect it may be arranged that when the data packets corresponding to the required teletext page are located in the background memory, the data packets are caused to be scanned in the order in which they were received to cause them to be stored in the page memory.

The method as aforesaid may also be characterized by the steps of determining in conjunction with the reverse order scanning only the packet address of each of the stored data packets and determining only in respect of stored data packets which correspond to a page header the page address of each header, thereby to locate the page header corresponding to the required teletext page.

When the page header corresponding to the required teletext page is located the scanning of packets in the background memory in the order in which they were received may commence at a given number of packets prior to that in which the page header was located.

BRIEF DESCRIPTION OF THE DRAWING

An exemplary embodiment of the invention will now be described reference being made to the accompanying drawings, in which.

DESCRIPTION OF THE PREFERRED EMBODIMENT

Figure 1:
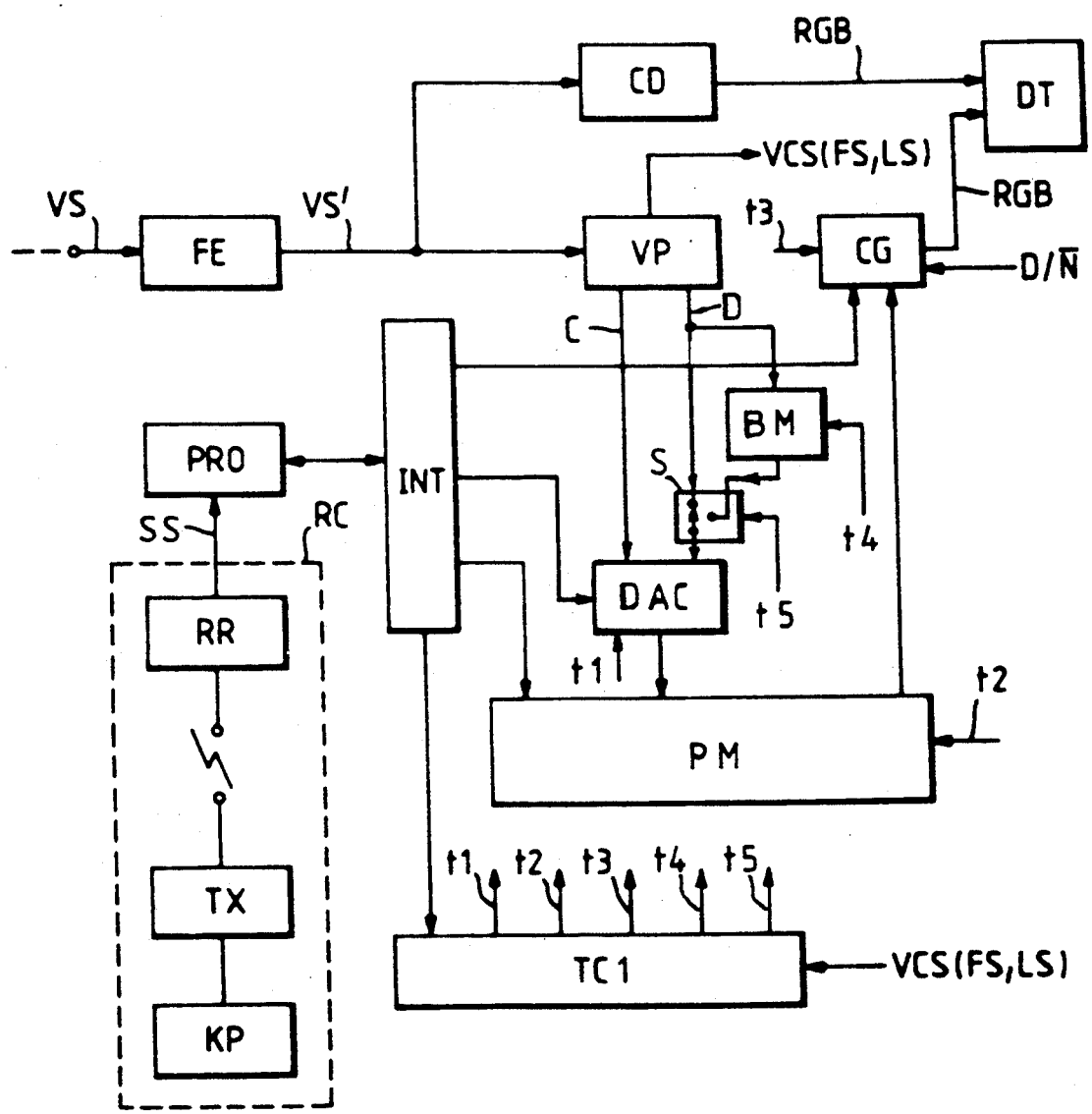
FIG. 1 is a block schematic diagram of a teletext television receiver incorporating a teletext decoder having a background memory.

In FIG. 1 of the drawings there is shown a teletext television receiver which comprises video and data processing circuits for receiving and displaying both normal picture information and teletext information. The front end FE of the receiver comprises the usual amplifying, tuning and i.f. detector circuits, and is connected to receive an incoming television video signal VS. For normal picture display by the television receiver, the demodulated video signal VS' is applied to a color decoder which produces the R, G and B component signals for the picture display. Time base circuits for a display tube DT U receive the usual line and field synchronising pulses from a sync. separator circuit (not shown) which extracts these synchronising pulses from the video signal VS'. The element CD represents the color decoder and those other circuit elements which are provided for conventional picture display.

The demodulated video signal VS' is also applied to a teletext decoder section of the teletext television receiver which deals with the receipt and display of the alpha-numeric text, ideographic and other teletext information that is received in digitally coded form. This section comprises a video processor circuit VP which performs inter alia data slicing for retrieving teletext data pulses D from the video signal VS'. The video processor VP also produces input data clock pulses C from the data pulses D. The data pulses D, via a switch S, are fed together with the clock pulses C to a data acquisition circuit DAC which is operable to feed selected groups D/G of the teletext data pulses to a page memory PM as address and display information. The page memory PM, which can be either a static random access memory (SRAM) or a dynamic random access memory (DRAM), has a capacity for storing at least one page of information including extension packets, a displayed page typically consisting of 24 display rows, each of which comprises bytes of teletext data, plus a limited number of extension packets. This page and row format is described in the aforementioned publication "World System Teletext and Data Broadcast System".

A logic processor PRO is operable in accordance with select signals SS applied to it from a remote control arrangement RC to control which groups of teletext data pulses D/G are acquired by the data acquisition circuit DAC. The remote control arrangement RC has a receiver part RR and a remote transmitter part comprising a transmitter TX and a keypad KP. The processor PRO is connected to an interface circuit INT via a data bus commonly referred to as the I²C bus and is operable memory PM display information including both attribute and U character information, for the selected page, for application to a character generator CG which is responsive to this display information to provide R, G and B component signals for the display. A timing circuit TC1 provides timing signals on connections t1 to t3 for the circuit elements DAC, MEM and CG. These circuit elements and the timing circuit TCl are accessed by the processor PRO via the interface circuit INT. The operation of the timing circuit is synchronized with the received video signal by a composite pulse signal VCS which contains the line (LS) and field (FS) synchronizing pulses which are separated from B the demodulated video signal VS' in the video processor VP.

In the teletext television receiver thus far described with reference to FIG. 1, only single line connections have been shown for the interconnections between the various circuit elements for the sake of simplicity. However, it will be apparent to a person skilled in the art that in practice most of these interconnections are multi-line. For instance whereas the teletext data pulses D retrieved from the video signal VS' are applied serially to the data acquisition circuit DAC over a single connection serial-to-parallel conversion would take place within this circuit DAC, so that the groups D/G of teletext data pulse area applied to the memory PM in parallel over a multi-line connection. Also, the I²C bus between the processor PRO and the interface circuit INT are a multi-line bus. Although a composite television receiver for receiving both normal picture information and teletext information is exemplified in FIG. 1 it will be appreciated that the teletext decoder section for data acquisition together with the front end FE may be provided as a separate teletext decoder which is adapted to feed either a CRT display monitor or a conventional television receiver.

In the teletext television receiver thus far described with reference to FIG. 1, when a user selects a particular teletext page using the keypad KP the processor PRO conditions the data acquisition circuit DAC to cause the required page to be acquired from the cyclic teletext transmission the next time it occurs therein and stored in the page memory PM, for subsequent display on the display tube DT.

As has already been mentioned, because of the large number of pages which can be transmitted, the time taken to acquire the required page can be up to 30 seconds.

In order to reduce this waiting time, the teletext decoder section is provided with a background memory BM which is connected to receive the teletext data pulses D from the video processor circuit VP. The timing chain TC1 produces a timing signal t4 which is applied to the background memory BM represents the memory addressing for the writing and scanning modes.

The teletext data pulses D from the video processor circuit VP are in the form of so-called data packets, each data packet comprising 42 bytes of teletext data, and each of which corresponds to a row of teletext data. The first 2 bytes of each data packet contain Hamming coded magazine and row address information and the remaining 40 bytes are character bytes containing character generation information. The 40 character bytes of each of the 24 display rows of a teletext page are stored in the page memory PM.

The teletext data packets received by the background memory BM are stored in the order in which they are received, and as each new packet is received it overwrites the oldest packet currently stored in the background memory BM. Thus the latest N teletext data packets, where N is dependent upon the size of the background memory BM, are always stored in the background memory BM.

It will be appreciated that in accordance with the World System Teletext specification already referred to, teletext data is only transmitted in the television signal during the vertical blanking interval (VBI) during which time no picture information is present on the television signal. Thus, the data acquisition circuit DAC of FIG. 1 can only receive "live" teletext data during the VBI period.

Outside of the VBI period it is possible by means of the switch S, under the control of output t5 from the timing circuit TC1, to switch the input of the data acquisition circuit DAC from the output of the video processor circuit VP to the output of the background memory BM, the contents of which can be rapidly scanned, typically in less than one second, to determine whether a required teletext page is stored in the background memory BM. If it is, the required page can be rapidly transferred to the memory page PM for display on the display tube DT. When the scan of the background memory BM is complete or for the duration of the next VBI period, the switch S is operated to connect the input of the data acquisition circuit DAC back to the output from the video processor circuit VP. In this way the waiting time for a required page can on average be substantially reduced and, if the background memory is large enough to contain all the transmitted teletext pages can eliminate the waiting time completely.

It is able to do this with a single page memory PM and single data acquisition circuit DAC without the need for complex software associated with multi-page and multi acquisition systems which impose, among other things, undue burdens on the I²C bus.

However, the background memory arrangement described with reference to FIG. 1 suffers from the disadvantages hereinbefore referred to namely that a large size memory is required and also problems can arise due to the fact that when the background memory is scanned, the data packets which have been stored the longest are scanned first and can result in the problems already referred to.

Figure 2:
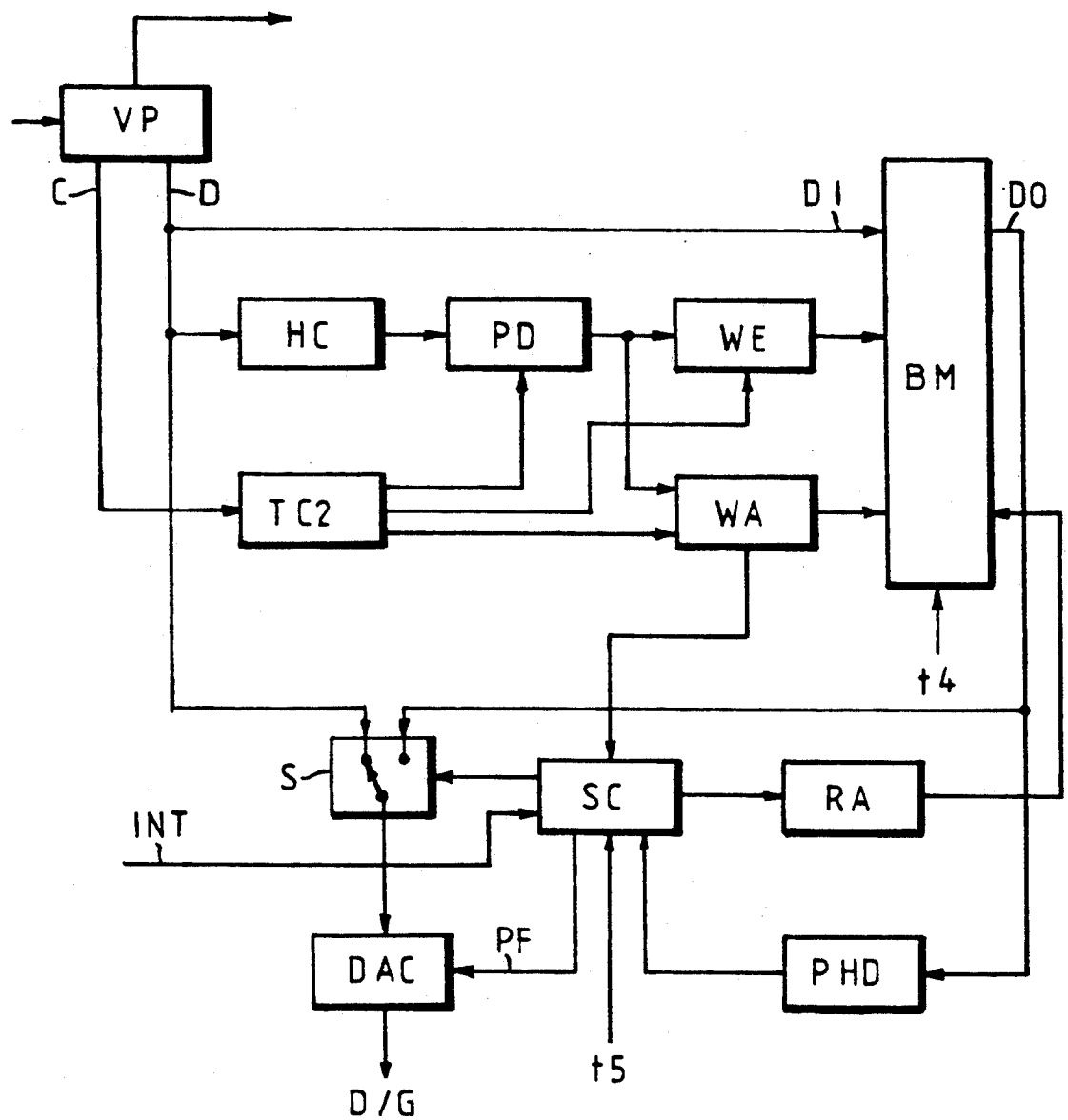
FIG. 2 is a block schematic diagram of part of the teletext decoder of FIG. 1 amended in accordance with the present invention.

In FIG. 2 of the drawings there is shown an improved form of background memory arrangement for use in the teletext television receiver of FIG. 1.

In FIG. 2, only those parts of the arrangement of FIG. 1 have been included which are affected by the improved background memory arrangement which is to be described. However, it is to be assumed that the arrangement of FIG. 2 forms part of the teletext television receiver of FIG. 1.

In the arrangement of FIG. 2, the input to the data acquisition circuit DAC is derived either from the teletext data output D from the video processor circuit VP or from the data output DO from the background memory BM by means of the switch S which is under the control of a scanning circuit SC.

The teletext data pulses D from the video processor circuit VP are applied directly to the data input DI of the background memory BM to a [8,4] Hamming check circuit HC. The output from the Hamming check circuit HC is fed to a packet B detector PD which acts effectively as a packet filter and prevents unwanted data packets from being stored in the background memory BM. For example, some broadcasters provide commercial data services via teletext using so-called packets 31 and these are not relevant for "domestic" teletext decoders. The purpose of the packet detector PD is to prevent data packets which cannot be used by the teletext decoder from cluttering up the background memory BM, thereby leaving more room in the background memory BM for data packets which are required. The output from the packet detector PD is applied to a write enable circuit WE which outputs a "WRITE" command to the background memory BM. The output from the packet detector PD is also applied to a write address circuit WA which determines where in the background memory BM the next data packet is to be written.

The packet detector PD, write enable circuit WE and write address WA are all supplied with timing information from a further timing circuit TC2 which derives its input from the clock pulses C from the video processor circuit VP.

As teletext data packets are received by the video processor circuit VP they are stored in the background memory BM, and as each new packet arrives it overwrites the oldest packet currently stored in the background memory BM.

Reading out of the contents of the background memory BM via the data output DO is controlled by the scanning circuit SC via a read address circuit RA which determines which data packet is to be read out.

During the VBI period of the television signal, the scanning circuit SC causes the switch S to connect the input of the data acquisition circuit to be connected to the teletext data output from the video processor circuit VP. The arrangement then operates as a normal teletext decoder and in addition, data packets, as they are received, are stored in the background memory BM.

When a request for a required teletext page is made, this is input to the scanning circuit SC via the interface INT. If the request is made during a VBI period, the scanning circuit SC does nothing and waits for the end of the VBI period. At the end of the VBI period the scanning circuit SC causes the switch S to be operated to connect the data acquisition circuit DAC to the data output DO of the background memory BM and causes the data packets in the background memory to be scanned in reverse order to that in which they were received i.e. most recently received data packet first, this being determined by the output from the write address circuit WA which is connected to the scanning circuit SC.

In order to speed up the scanning process, the data acquisition circuit DAC only checks the first 2 bytes of each data packet, rather than the whole data packet as is conventionally done, and only when a page header is detected, this being achieved by the page header detector PHD, are the following 6 data bytes checked to determine whether it is the page header corresponding to the required page or not. When the page header of the required teletext page is detected, the scanning circuit SC outputs a page found signal PF to the data acquisition circuit DAC which then causes the page memory PM connected to it (FIG. 1) to be cleared. The scanning circuit SC also causes the scanning of the data packets in the background memory BM to be reversed so that the data packets of the required page are output to the data acquisition circuit DAC in the order in which they were received into the background memory BM.

Having located the page header of the required teletext page, it is possible that the packets following the header only relate to the lower portion of the page as the page may have been interrupted to enable a teletext sub-title page to be transmitted (normally up to 3 rows). To overcome this, the scanning of the background memory BM in the forward direction may be set to commence a predetermined number of packets (say 256) prior to the detected page header so as to ensure that the first part of the requested page (when so interrupted) is also captured.

The scanning of the background memory BM by the scanning circuit SC can be effected very rapidly, typically in less than U one second, so that if the requested page is stored in the background memory BM it is output to the page memory for display virtually immediately. The fact that the data packets in the background memory BM are scanned starting from the most recently received data packet means that any pages retrieved from the background memory BM are the last transmitted pages or sub-pages. On the completion of the scan, the scanning circuit SC operates the switch S to connect the data acquisition circuit DAC directly to the teletext data output from the video processor circuit VP to receive the required teletext page when it is next transmitted, this inevitably involving the user in some waiting time.

The arrangement which has been described, as well as being suitable for receiving normal teletext transmission and lends itself to receive teletext transmissions which are transmitted in a so-called "row adaptive" manner.

This is possible because the data packs stored in the background memory BM are stored together with their row address bytes and also because the page memory is cleared automatically when a required page has been located in the background memory BM.

This "row adaptive" capability and the fact that some data packets are inhibited from being stored in the background memory BM (by by packet detector PD) enables efficient use of the background memory BM to be used and the limited checking of the stored data packets enables rapid scanning and therefore retrieval times to be achieved.

From reading the present disclosure, other modifications will be apparent to persons skilled in the art. Such modifications may involve other features which are already known per se and which may be used instead of or in addition to features already described herein. Although claims have been formulated in this application to particular combinations of features, it should be understood that the scope of the disclosure of the present application also includes any novel B feature or any novel combination of features disclosed herein either explicitly or implicitly or any generalization thereof, whether or not it relates to the same invention as presently claimed in any claim and whether or not it mitigates any or all of the same technical problems as does the present invention.

I claim:

1. A teletext decoder arrangement for teletext transmissions comprising a page memory for storing data packets of said teletext transmissions corresponding to a teletext page, a background memory for storing data packets of said teletext transmissions as they are received and scanning means for causing the stored data packets of said background memory to be scanned to locate the data packets corresponding to a required teletext page, said scanning means including means adapted to scan the stored data packets of said background memory in the reverse order to that in which they are received to locate said data packets corresponding to said required teletext page.

2. An arrangement as claimed in claim 1 wherein when the data packets corresponding to said required teletext page are located in said background memory, said scanning means includes means for scanning said data packets in the order in which they were received to cause them to be stored in said page memory.

3. An arrangement as claimed in claim 1 including means, operable in conjunction with said reverse order scanning means, for determining only the packet address of each of said stored data packets, and means, operable only in respect of stored data packets which correspond to a page header, for determining the page address of each said page header, thereby to locate the page header corresponding to said required teletext page.

4. An arrangement as claimed in claim 1 wherein when the page header corresponding to said required teletext page is located, said arrangement including means operable to cause the scanning of packets in said background memory in the order to which they were received to commence at a given number of packets prior to that in which the said page header was located.

5. An arrangement as claimed in claim 1 including means, operable on the data packets of said teletext transmissions, for inhibiting the storage of unwanted data packets in said background memory.

6. An arrangement as claimed in claim 1 including means, operable when the data packets of said required teletext page have been located, for clearing said page memory.

7. An arrangement as claimed in claim 2 wherein when the data packets corresponding to said required teletext page are located in said background memory, said scanning means includes means for scanning said data packets in the order in which they were received to cause them to be stored in said page memory.

8. An arrangement as claimed in claim 7 including means, operable in conjunction with said reverse order scanning means, for determining only the packet address of each of said stored data packets, and means, operably only in respect of stored data packets which correspond to a page header, for determining the page address of each said page header, thereby to locate the page header corresponding to said required teletext page.

9. An arrangement as claimed in claim 8 wherein when the page header corresponding to said required teletext page is located, said arrangement including means operable to cause the scanning of packets in said background memory in the order in which they were received to commence at a given number of packets prior to that in which the said page header was located.

10. An arrangement as claimed in claim 9 including means, operable on the data packets of said teletext transmissions, for inhibiting the storage of unwanted data packets in said background memory.

11. A method of decoding teletext transmissions, comprising the steps of storing data packets of the teletext transmission corresponding to a teletext page in a page memory, storing data packets of the teletext transmissions as they are received in a background memory, scanning the stored data packets of the background memory to locate the data packets corresponding to a required teletext page, and scanning the stored data packets of the background memory in the reverse order to that in which they are received to locate the data packets corresponding to the required teletext page.

12. A method as claimed in claim 11 including when the data packets corresponding to the required teletext page are located in the background memory, scanning the data packets in the order in which they were received to cause them to be stored in the page memory.

13. A method as claimed in claim 11 including determining in conjunction with the reverse order scanning only the packet address of each of the stored data packets and determining only in respect of stored data packets which correspond to a page header the page address of each page header, thereby to locate the page header corresponding to the required teletext page.

14. A method as claimed in claim 11, when the page header corresponding to the required teletext page is located, the scanning of the packets in the 15. A method as claimed in claim 11, including the step of clearing the page memory when the data packets of the required teletext page have been located.

16. A method as claimed in claim 15 including when the data packets corresponding to said required teletext page are located in said background memory, scanning said data packets in the order in which they were received to cause them to be stored in said page memory.

17. A method as claimed in claim 16 including determining in conjunction with said reverse order scanning only the packet address of each of said stored data packets and determining only in respect of stored data packets which correspond to a page header the page address of each page header; thereby to locate the page header corresponding to said required teletext page.

18. A method as claimed in claim 17 when the page header corresponding to said required teletext page is located, the scanning of the packets in said background memory in the order in which they were received commences at a given number of packets prior to that in which the said page header was located.

* * * * *